Nov. 25, 1952 — J. S. VOIGT — 2,619,210
SYNCHRONIZER CLUTCH
Filed Oct. 15, 1945 — 2 SHEETS—SHEET 1
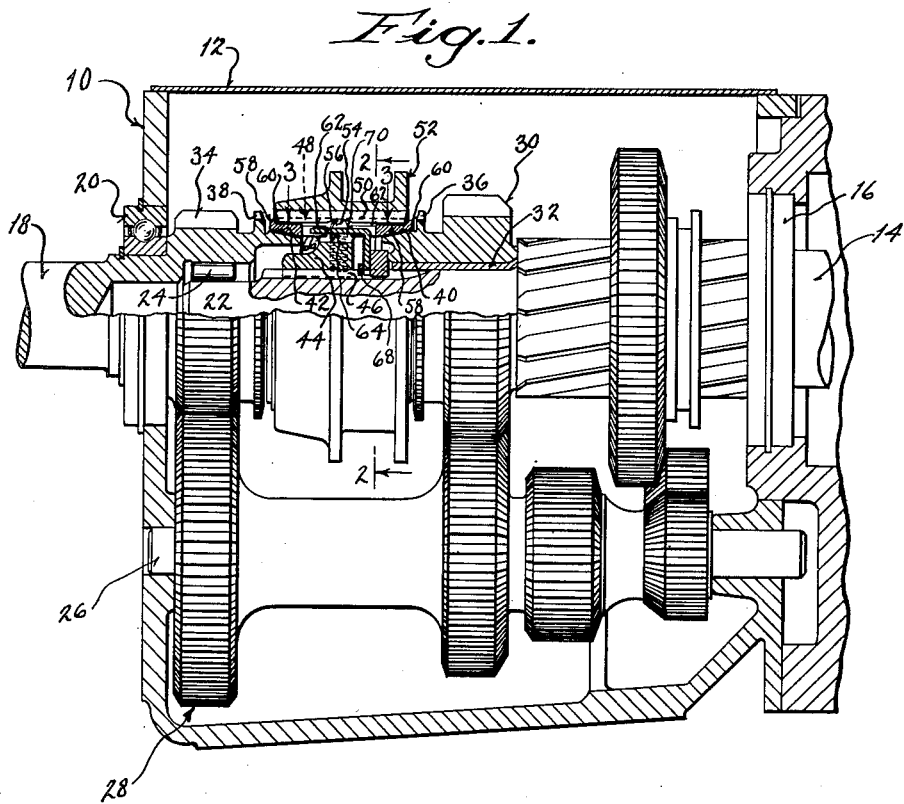
INVENTOR
JOHNSTON STUART VOIGT
BY Carl J. Barbee
HIS ATTORNEY

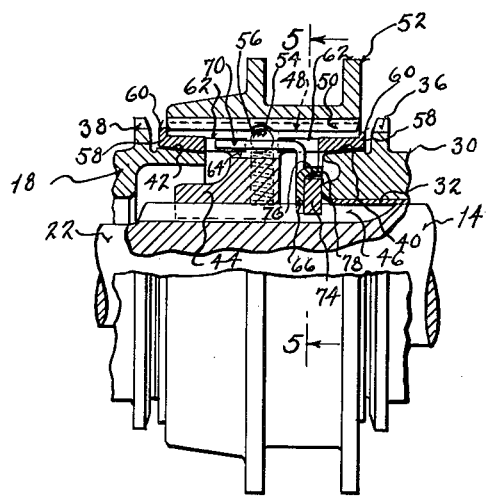
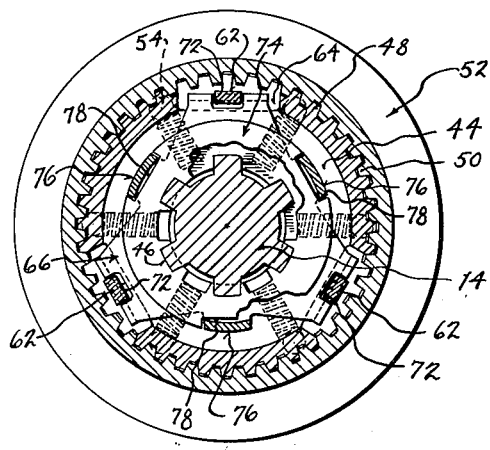
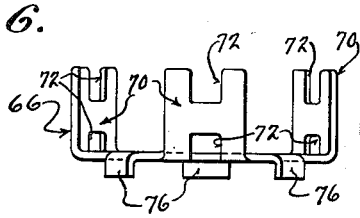
INVENTOR
JOHNSTON STUART VOIGT
BY Carl J. Barbee
HIS ATTORNEY Patented Nov. 25, 1952

2,619,210

UNITED STATES PATENT OFFICE 2,619,210

SYNCHRONIZER CLUTCH

Johnston Stuart Voigt, Kenosha, Wis., assignor to Nash-Kelvinator Corporation, Kenosha, Wis., a corporation of Maryland Application October 15, 1945, Serial No. 622,283

7 Claims. (Cl. 192—53)

This invention relates to improvements in transmission gearing and more particularly to improvements in speed clutch synchronizers for power transmissions of automobiles.

It is an object of this invention to provide a synchronizer for a power transmission wherein the clutch cones will be driven by means other than a synchronizer hub.

It is a further object of this invention to provide synchronizer means which will require less manual effort to shift into engagement with the cooperating gears of the transmission.

It is another object of this invention to provide a speed synchronizer for a power transmission which will be economical in its manufacture, simple in its use and which will require little revision of the parts of the ordinary automotive transmission.

Further objects and advantages of this invention will be apparent from a consideration of the following description and claims and the attached drawings, of which there are two sheets and in which like reference characters are used to designate like parts, and in which:

Figure 1 is a side elevation, partially in section, of a power transmission for an automobile;

Figure 2 is a view taken along lines 2—2 of Figure 1 and looking in the direction of the arrows;

Figure 3 is a view taken along the line 3—3 of Figure 1 and looking in the direction of the arrows;

Figure 4 is a side elevation of a portion of an automotive transmission, partially in section, showing a modification of applicant's invention;

Figure 5 is a view taken along line 5—5 of Figure 4 and looking in the direction of the arrows; and Figure 6 is a plan view of the driving means for the friction clutch cones of the modification of the invention shown in Figure 4.

In Figure 1 is shown an automotive transmission comprised of a casing 10 provided with a cover 12, a driven shaft 14 journaled in a ball bearing 16 which is secured in the rear wall of casing 10 and a clutch shaft 18 which is journaled in a ball bearing 20 secured in the forward end of casing 10. The forward end 22 of driven shaft 14 is journaled within roller bearings 24, which are positioned within a hole formed in the rearward end of clutch shaft 18. A countershaft 26 is secured in the walls of casing 10 parallel with clutch shaft 18 and driven shaft 14 and rotatively supported upon said countershaft 26 is the usual countershaft gear cluster indicated generally at 28.

One gear of said countershaft gear cluster 28 is in constant engagement with gear 30 which is rotatively supported upon driven shaft 14 by bearing 32. Another gear of gear cluster 28 is in constant engagement with gear 34 which is formed on clutch shaft 18 within transmission case 10.

Formed on gear 30 is an intermediate clutch gear 36 and formed on clutch shaft 18 is clutch gear 38. Also formed on gear 30 forwardly of gear 36 is clutching surface 40. Formed on the rearward end of clutch shaft 18 is a clutch surface 42.

The transmission within transmission case 10 is provided with a jaw clutch synchronizer comprised of an internally splined hub 44 which is telescopically positioned upon and in driving engagement with splined portion 46 of driven shaft 14. Around its outer periphery, hub 44 is defined by a series of gear teeth 48 which are in constant engagement with internal gear teeth 50 of collar 52 which is telescopically positioned around hub 44. Collar 52 is designed to be moved forwardly and rearwardly of the hub 44 into direct engagement with gear 36 and gear 38.

Hub 44 is provided with a series of spring pressed balls 54 which are positioned to engage grooves 56 formed in teeth 50 opposite said balls 54. In this manner, the movement of collar 52 independently of hub 44 is resisted as balls 54 must be moved out of grooves 56 to move collar 52 rearwardly or forwardly without moving hub 44.

A pair of friction clutch cones 58 are positioned between hub 44 and surfaces 40 and 42. Clutch cones 58 have radially extending flanges 60 adjacent the sides of hub 44 so that said cones will be moved axially into engagement with surfaces 40 and 42 when said hub 44 is moved axially in one direction or the other. Said cones have a series of lugs 62 opposite flanges 60 which extend axially into a series of cutout portions 64 of hub 44.

Driving means for the cones 58 are provided by an internally splined disc 66 which is telescopically positioned on and in driving connection with splined portion 46 of driven shaft 14. Said disc 66 is secured against axial movement on shaft 14 by snap ring 68 positioned within grooves in portion 46 of shaft 14. Disc 66 has a series of forwardly extending H-shaped portions 70 which extend through the cutout portions 64 of hub 44. This is more clearly shown in Figures 2 and 3. The series of lugs 62 of friction cones 58 are positioned in cutout portions 72 of the portions 70, thereby forming a driving connection between disc 66 and the friction cones 58.

As described hereinbefore, applicant's invention provides for driving of the friction cones 58 by disc 66 independently of the hub 44 and therefore the energy necessary to shift hub 44 and collar 52 is minimized.

The modification of the invention shown in Figures 4, 5 and 6 embodies a novel means for providing a forward limit to the movement of gear 30 and rearward movement of internally splined driving disc 66.

Abutting gear 30 on splined portion 46 of main shaft 14 is internally splined thrust washer 74 which is telescopically positioned on portion 46 of shaft 14 and is rotated about the axis thereof, moving its internal splines into peripheral grooves in the splines of portion 46 so that the splines of washer 74 are in alignment with the splines of said portion 46, preventing movement of washer 74 along the axis of shaft 14. In this manner, washer 74 limits the forward movement of gear 30 along shaft 14.

To prevent rotation of thrust washer 74 around the axis of shaft 14 after complete assembly of the synchronizer, disc 66 is provided with a series of rearwardly extending portions 76 which are positioned within a series of grooves 78 formed in the outer periphery of washer 74. Disc 66 is in splined engagement with splined portion 46 of shaft 14 and therefore, due to portions 76 of disc 66 being positioned in grooves 78 of washer 74, said washer cannot rotate about the axis of shaft 14 to a position where its internal splines will be out of alignment with the splines of portion 46, which would allow it to move axially along shaft 14.

Disc 66 is capable of a limited amount of axial movement along shaft 14 to compensate for relative movement of other parts during shifting operations; however, disc 66 cannot move far enough forward to withdraw portions 76 from grooves 78 of thrust washer 74.

If it is desired to secure disc 66 on shaft 14 so that it cannot move axially, peripheral grooves can be formed in the splines of shaft 14 to permit the internal splines of disc 66 to rotate about the axis of shaft 14 into alignment with the splines thereof, thus preventing axial movement of disc 66. If this is done, internally splined thrust washer 74 is not permitted to rotate around shaft 14 and thus the positioning of portions 76 of disc 66 in grooves 78 of washer 74 will prevent disc 66 from further rotation around the axis of shaft 14 so its splines cannot move out of alignment with the splines of shaft 14.

Disc 66 in its other features is identical to disc 66 of Figures 1, 2 and 3 in that it has a forwardly extending H-shaped portion 70 which has cutout portions 72 therein.

Friction clutch cones 58 of Figure 4 are identical to those of Figure 1 as is the construction of the collar 52, hub 44, gear 30, gear 36, gear 38 and clutch shaft 18.

The manner of operation of the mechanism shown in Figures 4, 5 and 6 is identical to that shown in Figures 1, 2 and 3, the novelty being in the provision of the thrust washer 74 and as to the manner of assembling the mechanism as shown in Figure 4.

The mechanism shown in Figures 1, 2 and 3 is assembled by first holding shaft 14 in case 10, then telescopically positioning bearing 32 and gear 30 therearound in the position shown. Next, the friction cone 58 (adjacent gear 30) and thrust washer 74 are in a like manner positioned around shaft 14. Disc 66 is then pushed on said shaft against washer 74 with lugs 62 of said cone 58 positioned within cutout portions 72 of disc 66 and snap ring 68 is placed in grooves on portion 46 of shaft 14 to hold this assembly in assembled position. Next, hub 44 with collar 52 is pushed on portion 46 into engagement therewith and with H-shaped portion 70 of disc 66 extending through cutout portions 64 of said hub. Next, the other friction cone 58 is positioned with its lugs 62 in the cutout portions 72 on the forward end of portion 70 of disc 66. Finally, end 22 of shaft 14 is positioned within bearings 24 of clutch shaft 18.

Assembly of the modification shown in Figures 4, 5 and 6 is slightly different in that the rearwardly extending portions 76 of disc 66 must be positioned in grooves 78 of washer 74. If washer 74 is rotated about the axis of shaft 14 to a position in which its internal splines are in alignment with the splines of portion 46, as hereinbefore described, the disc 66 may then be pushed on portion 46 and elements 76 will be in alignment with grooves 78 and can be pushed therein. However, if disc 66 is to be rotated, as hereinbefore described, around the axis of shaft 14 so its internal splines align with the splines of portion 46, washer 74 must be positioned on portion 46, then disc 66 pushed thereon and rotated about the axis of shaft 14 until portions 76 are in alignment with grooves 78 and then portions 76 are bent rearwardly and inwardly into said grooves to the position shown, at which position the internal splines of disc 66 will be in alignment with the external splines of portion 46. The remainder of the assembly is identical to that of the invention shown in Figures 1, 2 and 3.

While I have described my invention in some detail, I intend this description to be an example only and not a limitation of my invention, to which I make the following claims:

1. In a power transmission, a driving mechanism, a driven mechanism, a pair of jaw clutch means formed on said driving mechanism, a shiftable jaw clutch element drivingly associated with said driven mechanism and adapted to positively engage either of said jaw clutch means, friction clutch elements positioned between said driving mechanism and said driven mechanism to form a frictional driving connection therebetween when said jaw clutch element is shifted toward positive engagement with either of said jaw clutch means, and a single member drivingly associated with said driven mechanism and all said friction clutch elements for driving the clutch elements independent from other elements of the driven mechanism.

2. In a power transmission, a driving mechanism, a driven mechanism, a pair of jaw clutch elements formed on said driving mechanism, a clutch surface formed adjacent each jaw clutch element, a synchronizer drivingly associated with the driven mechanism and positioned between said clutch surfaces and comprising a means movable into positive engagement with either of said jaw clutch elements, a hub element drivingly associated with said driven mechanism and said movable means, a friction clutch element positioned between said hub element and each of said clutch surfaces and adapted to drivingly connect said hub and clutch surfaces, and an element drivingly associated with said driven means and drivingly connected to said friction clutch elements for driving the same independently of the other elements of the synchronizer.

3. In an automotive transmission, a driving mechanism, a driven shaft, a pair of jaw clutch elements formed on said driving mechanism, clutch surfaces formed adjacent each jaw clutch element, a synchronizing mechanism drivingly associated with the driven shaft between said clutch surfaces and comprising a hub member drivingly associated with the driven shaft, a collar telescopically positioned around said hub in driving connection therewith and adapted to be moved into direct engagement with either of said jaw clutch elements, a friction clutch element positioned between each clutch surface and the hub and adapted to form a driving connection therebetween when the collar is moved toward engagement with either of said jaw clutch elements, and a driving disc drivingly associated with each of said friction clutch elements and drivingly associated with the driven shaft.

4. In a power transmission, a driving mechanism, a driven shaft, a pair of jaw clutch elements formed on said driving mechanism, a clutch surface formed on said driving mechanism adjacent each of said jaw clutch elements, a synchronizer drivingly associated with the driven shaft and positioned between said clutch surfaces and comprising a hub portion telescopically positioned on said driven shaft and in driving connection therewith, a collar telescopically positioned around said hub in driving connection therewith and adapted to directly engage said jaw clutch elements, friction clutch elements positioned between said clutch surfaces and said hub and adapted to form a driving connection therebetween, a driving element for said friction clutch elements telescopically positioned on said driven shaft and in driving engagement therewith, said driving element comprising a radially extending disc, a series of longitudinally extending members, slots in said members to receive portions of said friction clutch elements to form a driving connection therewith, a second series of longitudinally extending portions of said disc, a ring secured on said driven shaft, and a series of slots in the outer periphery of said ring adapted to receive each of said second series of longitudinally extending members to prevent rotation of said driving member around the axis of the driven shaft.

5. In a power transmission, a driving mechanism, a driven shaft, a pair of jaw clutch elements formed on said driving mechanism, clutch surfaces formed on said driving mechanism adjacent each jaw clutch element, a synchronizer mechanism telescopically positioned on said driven shaft and in driving connection therewith comprising a hub member drivingly associated with said driven shaft, a collar around said hub member drivingly associated therewith and adapted to directly engage said jaw clutch elements, friction clutch elements positioned between each of said clutch surfaces and said hub member and adapted to form a driving connection therebetween, a disc-like driving element drivingly associated with said driven shaft, a series of cutout portions in the outer periphery of said hub, a series of longitudinally extending portions on said disc-like portion adapted to extend through said cutout portions of the hub, a series of lugs formed on said friction clutch elements, a series of slots in said series of longitudinally extending portions adapted to receive said lugs to form driving connections between said portions and said friction clutch elements, a ring telescopically positioned on said driven shaft adjacent said disc-like portion, a second series of longitudinally extending portions formed on said disc-like portion, and a series of slots in the outer periphery of said ring adapted to receive said second series of longitudinally extending members.

6. In a power transmission, driving mechanism, a driven shaft, a synchronizer mechanism, jaw clutch means formed on the driving mechanism, a jaw clutch element associated with said synchronizer mechanism and adapted to selectively engage said jaw clutch means, friction clutch means positioned between said driving mechanism and said synchronizer mechanism for frictionally connecting same, and a single member directly associated with said driven shaft and all said friction clutch means for driving the friction clutch means independently in relation to the other elements of the synchronizer mechanism.

7. In a power transmission, a driving mechanism, a driven shaft, a synchronizer mechanism, jaw clutch elements formed on said driving mechanism, clutch surfaces formed on said driving mechanism, friction clutch means positioned between said synchronizer mechanism and said clutch surfaces for forming a driving connection therebetween, and a single means associated with said friction clutch means and directly connected to the driven shaft for driving the friction clutch means independent of the other parts of the synchronizer mechanism.

JOHNSTON STUART VOIGT.

REFERENCES CITED

The following references are of record in the file of this patent:

UNITED STATES PATENTS

| Number | Name | Date |
| --- | --- | --- |
| 1,024,595 | Noyes | Apr. 30, 1912 |
| 1,886,850 | Tenney | Nov. 8, 1932 |
| 1,923,378 | Hunt | Aug. 22, 1933 |
| 1,931,288 | Griswold | Oct. 17, 1933 |
| 2,160,091 | Simpson et al. | May 30, 1939 |